United States Patent
Miller

(10) Patent No.: US 6,920,819 B2
(45) Date of Patent: Jul. 26, 2005

(54) UNIFORM PISTON RING FILL

(75) Inventor: Gary Thomas Miller, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 86 days.

(21) Appl. No.: 10/396,061

(22) Filed: Mar. 25, 2003

(65) Prior Publication Data

US 2004/0187679 A1 Sep. 30, 2004

(51) Int. Cl.[7] .................................................. F16J 9/00
(52) U.S. Cl. ...................................... 92/249; 277/452
(58) Field of Search .................. 92/249, 251; 277/449, 277/452

(56) References Cited

U.S. PATENT DOCUMENTS 2,293,564 A * 8/1942 Schnell ........................ 277/452
4,676,143 A * 6/1987 Nomura et al. ............... 92/249

* cited by examiner

Primary Examiner—F. Daniel Lopez
(74) Attorney, Agent, or Firm—Patrick M. Griffin

(57) ABSTRACT

A piston and ring assembly for a compressor that may be used in a vehicle air conditioning system. The assembly comprises a piston and a ring located within a cylinder bore. The ring has a frustoconical shape and the piston has a complementary frustoconical groove. The ring is a parallelogram in cross-section.

7 Claims, 2 Drawing Sheets

UNIFORM PISTON RING FILL

BACKGROUND OF THE INVENTION

1. Field of the Invention

The present invention relates to a piston and seal assembly of a piston reciprocating in a cylinder of a compressor.

2. Description of the Prior Art

Piston rings are used to provide a sealing interface between a stationary cylinder bore and a moveable piston reciprocating therein. An example of such a sealing interface is disclosed in the U.S. Pat. No. 4,676,143 to Nomura et al. (the '143 patent).

The '143 patent discloses a piston seal interface for a compressor wherein a piston is slidably mounted in a cylinder bore and the piston has a circumferential groove with a resilient ring disposed in the groove. The circumferential groove has a centrally recessed bottom wall that allows the ring to be deformed in such a way that the pair of outer corner edges contact the cylinder bore. This configuration provides an increased sealing force at both the intake and discharge stage thereby increasing frictional contact and static torque between the piston ring and cylinder wall.

SUMMARY OF THE INVENTION AND ADVANTAGES

The present invention provides a piston and seal assembly comprising a cylindrical piston slidably mounted in a cylinder and having an annular groove in the outer circumference thereof. The groove is defined by upper and lower side walls that are spaced apart by a bottom and extend into the outer circumference of the piston. The upper side wall has a greater depth than the depth of the lower side wall so that the bottom defines a frustoconical shape about the piston. A piston ring with a frustoconical cross-sectional shape is disposed within the groove.

Accordingly, the present invention provides a piston and seal assembly having a uniform piston ring fill and support while reducing the static torque between the piston ring and a cylinder wall. This reduction in friction will result in improved compressor efficiency.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 3:
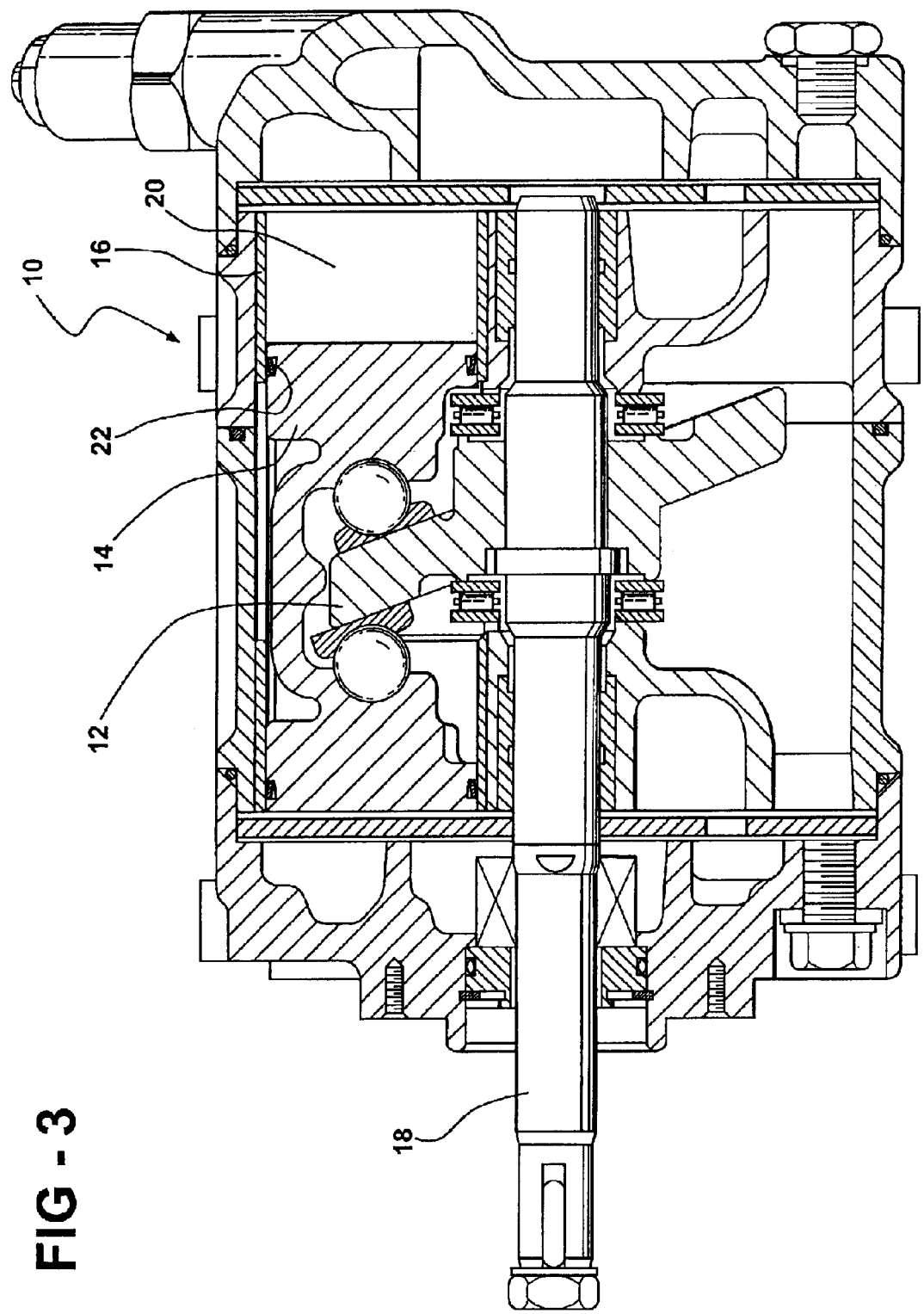
FIG. 3 is a cross-sectional view of a compressor in which the invention finds utility.

Referring to the Figures, wherein like numerals indicate like or corresponding parts throughout the several views, a compressor incorporating the invention is generally shown at 10 in FIG. 3. A typical compressor includes a swash plate 12 to reciprocate a plurality of pistons 14 with each piston 14 disposed in a cylinder bore 16. The swash plate 12 is connected to a driveshaft 18 that is, in turn, connected to a motor (not shown). The motor rotates the driveshaft 18 and the swash plate 12 to reciprocate the pistons 14 in the cylinder 16.

Vehicle air conditioning systems generally include a compressor that compresses and superheats refrigerant. The refrigerant exits the compressor and flows to a condenser and then to an expansion device. From the expansion device, the refrigerant enters an evaporator and then returns to the compressor to begin the cycle again.

A compression chamber 20 is defined on the top of each piston 14. This chamber 20 is used to compress the refrigerant during the upward stroke of the piston 14. In order to achieve adequate compression of the refrigerant, it is important to achieve a tight seal between the piston ring 22 and the cylinder bore 16.

Figure 1:
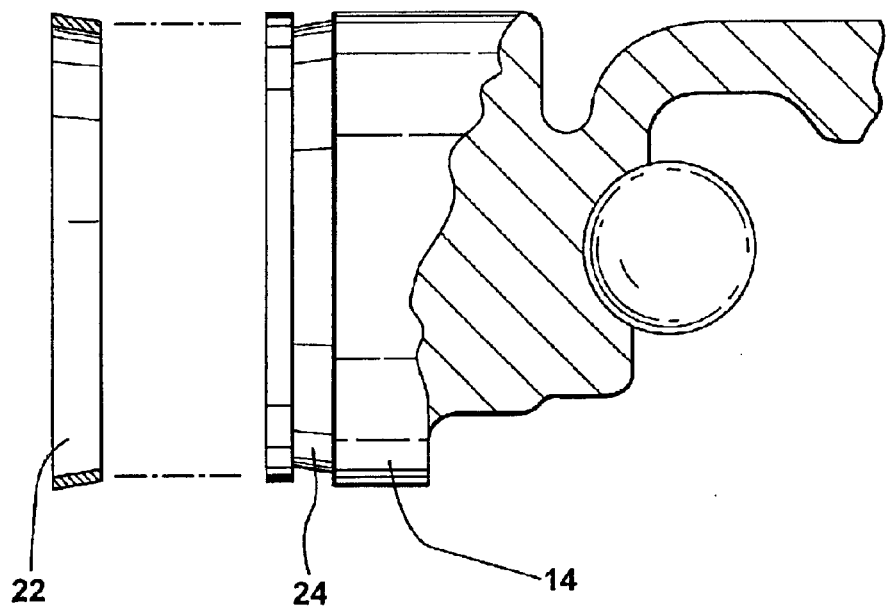
FIG. 1 is an exploded fragmentary view with the piston ring in cross-section.
Figure 2:
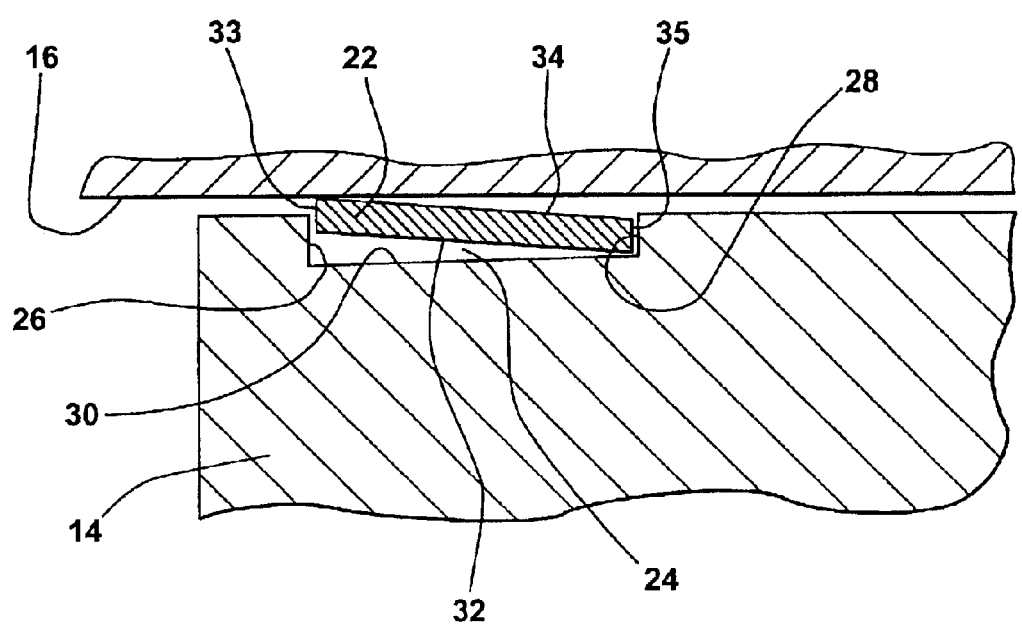
FIG. 2 is an enlarged fragmentary cross-sectional view of a portion of the piston of FIG. 1.

As best shown in FIGS. 1 and 2, the cylindrical piston 14 has an annular groove 24 in the outer circumference. The groove 24 is defined by an upper side wall 26 and a lower side wall 28 that are spaced apart by a bottom 30 and extend into the outer circumference of the piston 14. The upper side wall 26 has a greater radial depth into the circumference of the piston 14 than the depth of the lower side wall 28 into the piston 14 so that the bottom 30 defines a frustoconical shape about the piston 14.

In other words, the bottom 30 surface forms part of an annular section of a cone between the upper 26 and lower 28 side walls. A piston ring 22 with a frustoconical cross-sectional shape is disposed within the groove 24. The piston ring 22 has an outer and inner annular surface 32. The outer surface 34 is spaced apart and parallel to the inner surface 32. The cross-section of the piston ring 22 includes an outer end 33 extending between the annular surfaces 32, 34 and an inner end 35 extending between the annular surfaces 32,34. The outer 33 and inner 35 ends are parallel whereby a cross-section of the ring 22 is a parallelogram. Accordingly, the inner annular surface 32 intersects the inner end 35 at the inner diameter of the ring 22 where the inner diameter is smaller than the outer diameter.

The inner diameter of the ring 32 contacts the bottom 30 of the groove 24. The outer end 33 extends out of the groove 24. The inner end 35 is disposed adjacent to the lower side wall 28 of the groove 24 to create a seal. Likewise, the outer end 33 is disposed adjacent the upper side wall 26 of the groove 24 to create a seal.

The piston and ring assembly provides a snug fit between the ring 22 and the cylinder bore 16 on the upward stroke of the piston 14. On the downward stroke of the piston 14, the flexible ring 22 yields to the pressure such that the downward resistance is reduced by the relief of pressure. As such, the piston and ring assembly provides uniform piston ring 22 fill and support while reducing the static torque between the piston ring 22 and the cylinder wall 16.

Obviously, many modifications and variations of the present invention are possible in light of the above teachings. The invention may be practiced otherwise than as specifically described within the scope of the appended claims.

What is claimed is:

1. A piston and seal assembly comprising:

a cylindrical piston (14) for being slidably mounted within a cylinder and having an annular groove (24) in the outer circumference thereof, said groove (24) defined by upper (26) and lower side (28) walls spaced apart by a bottom (30) and extending into the outer circumference of the piston (14), said upper side wall (26) having a greater depth than the depth of said lower side wall (28) so tat said bottom defines a frustoconical shape about said piston (14), and a piston ring (22) having a frustoconical cross-sectional shape disposed in said groove and including outer and inner annular surfaces that are spaced apart and parallel with an outer end extending between said annular surfaces and an inner end extending between said annular surfaces.

2. An assembly as set forth in claim 1 wherein said inner annular surface (32) intersects said inner end (35) at an inner diameter of said ring (22) and said inner annular surface (32) intersects said outer end (33) at an outer diameter of said ring (22) with said inner diameter being smaller than said outer diameter.

3. An assembly as set forth in claim 2 wherein said inner (35) and outer ends (33) are parallel whereby a cross-section of said ring (22) is a parallelogram.

4. An assembly as set forth in claim 2 wherein said inner diameter (32) contacts said bottom (30) of said groove (24) and said outer diameter (33) extends out of said groove (24).

5. An assembly as set forth in claim 4 wherein said outer end (33) extends out of said groove (24).

6. An assembly as set forth in claim 5 wherein said inner end (35) is disposed adjacent said lower side wall (28) of said groove (24) and said outer end (33) is disposed adjacent said upper side wall (26) of said groove (24).

7. An assembly as set forth in claim 1 wherein said piston ring (22) is flexible.

* * * * *